Figure 5:
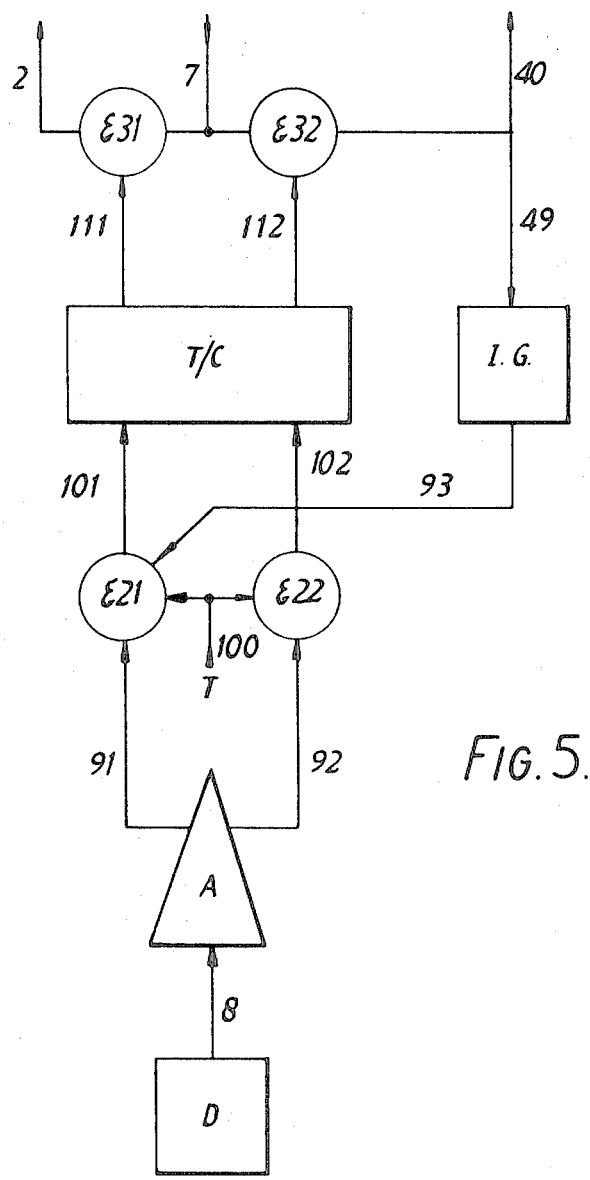

United States Patent

[11] 3,618,022

[72] Inventors Anthony Leonard Isaacs;
 John Victor James Corney, both of London, England
[21] Appl. No. 855,688
[22] Filed Sept. 5, 1969
[45] Patented Nov. 2, 1971
[73] Assignee British Lighting Industries Limited
 London, England
[32] Priority Sept. 6, 1968
[33]  Great Britain
[31]  42,639/68

[54] CONTROL APPARATUS
 6 Claims, 7 Drawing Figs.
[52] U.S. Cl. ................................................. 340/149,
  235/151.1
[51] Int. Cl. ...................................................... G05b 1/00
[50] Field of Search .......................................... 340/258 C,
  316, 198, 149; 235/151.1

[56] References Cited
UNITED STATES PATENTS

| | | | |
|---|---|---|---|
| 1,564,788 | 12/1925 | Hildebrand.................. | 340/198 |
| 2,659,533 | 11/1953 | Quinby et al. ............... | 340/258 C |
| 2,727,222 | 12/1955 | Bush............................ | 340/316 |
| 2,775,727 | 12/1956 | Kernahan et al............. | 340/316 |
| 3,496,560 | 2/1970 | Gams et al. ................. | 340/316 |
| 3,519,998 | 7/1970 | Barron ........................ | 235/151.1 |
| 3,530,310 | 9/1970 | Adelson et al................ | 340/258 C |

Primary Examiner—John W. Caldwell
Assistant Examiner—Howard Cohen
Attorney—Lawrence Burns ABSTRACT: Control apparatus for use at an operator-plant interface, for example for controlling stage-lighting equipment, having three signal stores of which the first and second give control signal outputs and the third serves either to set the signals in the first and second stores or to indicate the signal in the first or second stores. The third store may include a setting lever which serves for adjustment of the control signals and also indicates by its position the magnitude of those signals.

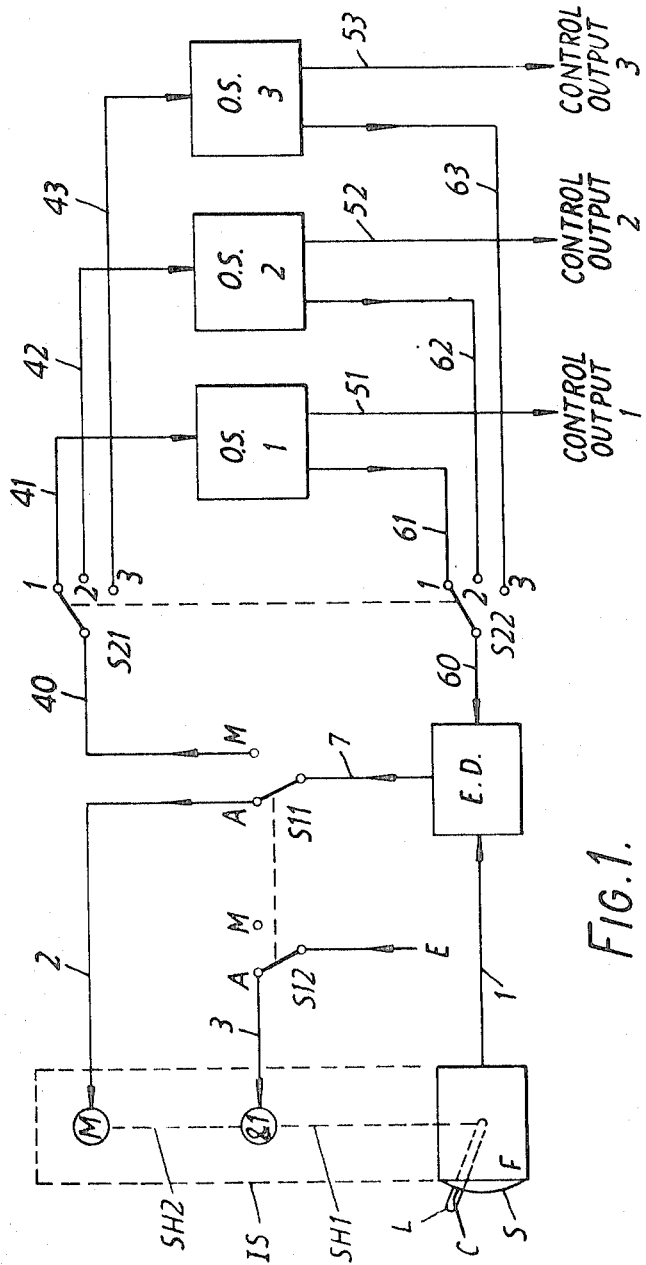

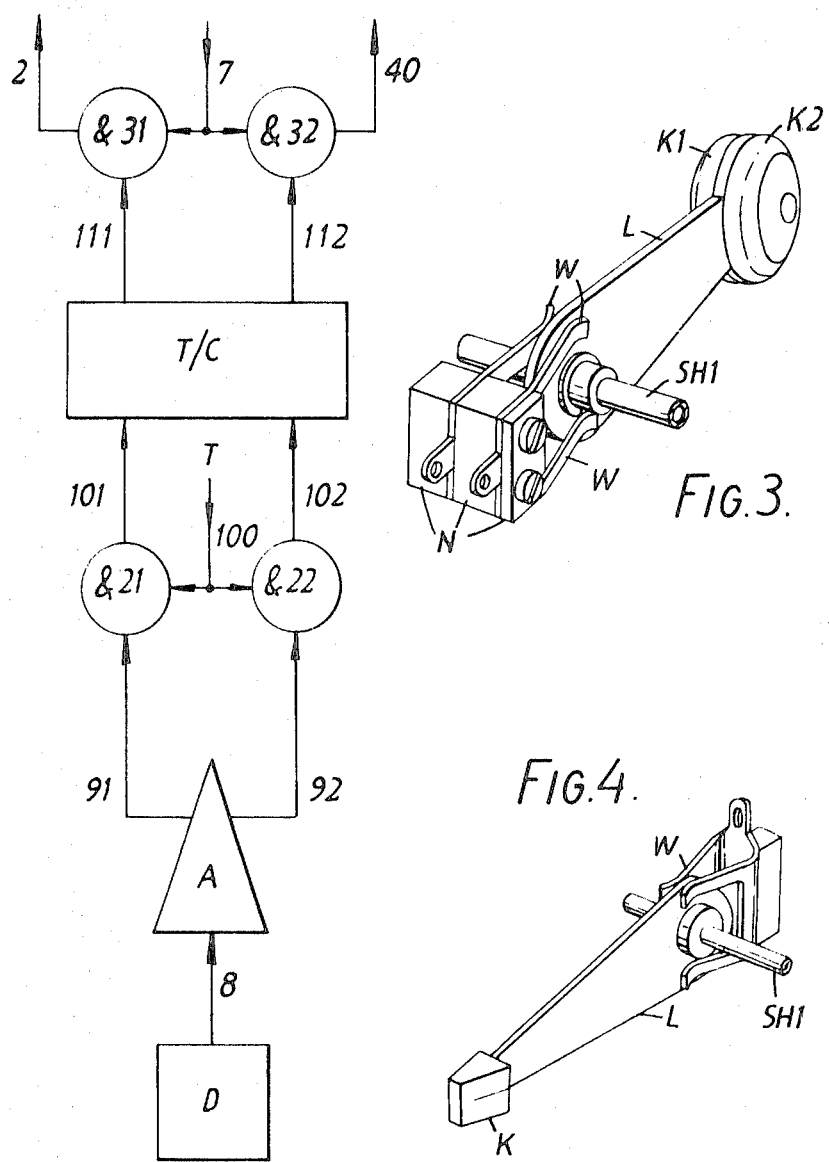

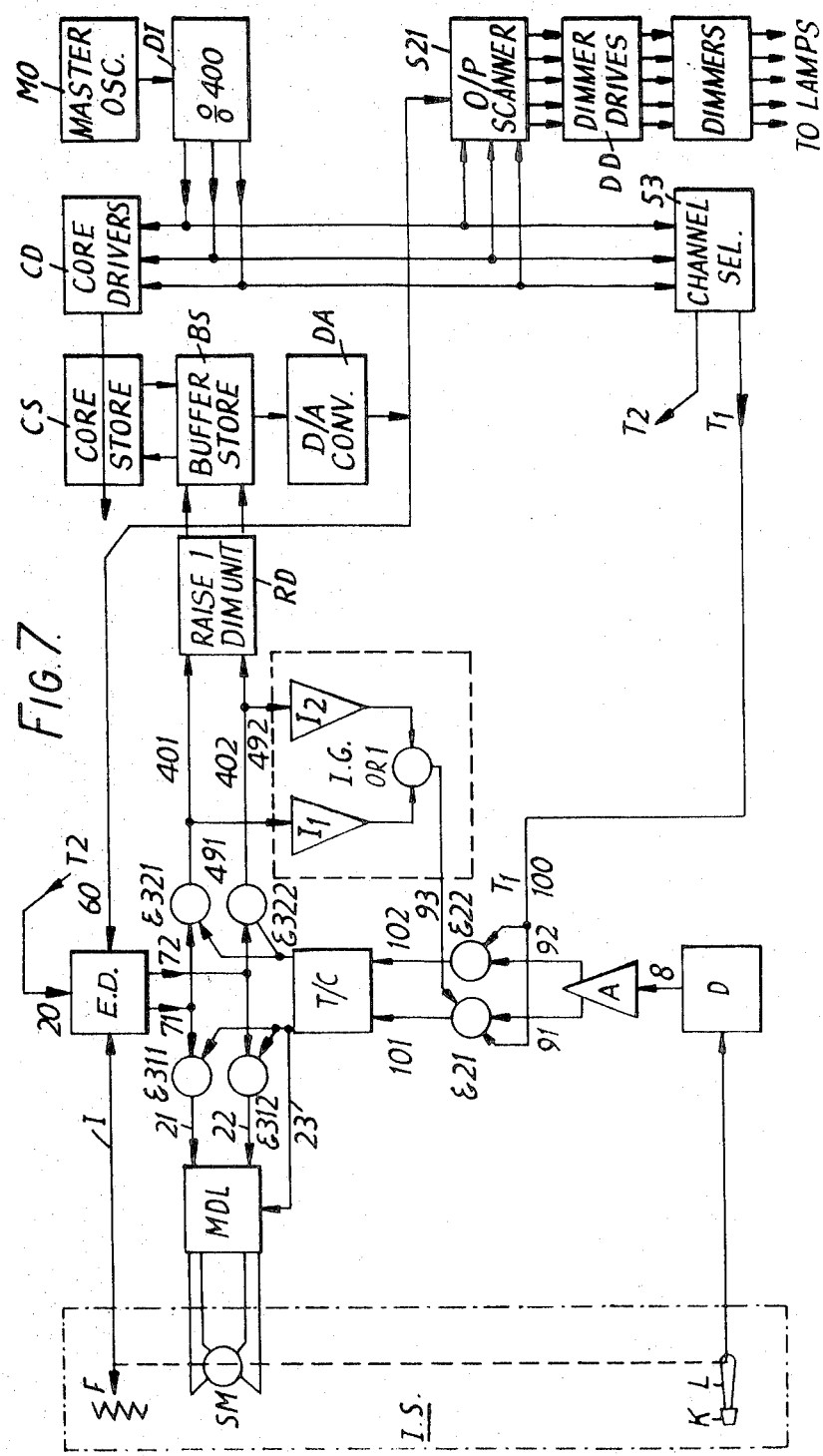

CONTROL APPARATUS

Complex operations such as industrial material processing or the production of complex stage lighting effects require complex plant for their routine performance. Human communication and data processing are slow relative to machine processing. Efficient operation requires that plant be controlled by a minimum of human operators, preferably one, who should handle only important data, instructing the plant only in situations beyond its routine capability. In an emergency the operator may need rapid access to and direct control of any parameter relevant to plant operation. The operator-plant interface may therefore require many channels for adequate indication and control. The controls should be presented compactly for easy operator access.

Control channels operating continually under only intermittent instruction must each include an information store from which continual control signals may be derived. Information may be stored durably in various ways such as, for example, a signal recirculated around a closed path including signal delay means, e.g. an acoustic or electromagnetic delay line, or may be stored as a spatial arrangement of mechanical, chemical, optical, electric, electrostatic or magnetic states of a durable medium.

Plant-to-operator signalling is generally visual using for example meters or gauges, or acoustic, such as by using alarm bells, etc. Operator-to-plant communication is generally mechanical because speech, though much faster, is too complex an encodement to allow ready machine translation by present techniques. Mechanical inputs may be continuously variable, e.g. by angular positioning of shafts using for example knobs, levers, handwheels or pedals, or may be quantized, i.e. reduced to a choice of specific values, using apparatus such as switches, keys and pushbuttons. All positional input means may be used as information stores if provided with frictional or other position-stabilizing means. The on/off switch of an electric vacuum cleaner and the thermostatic regulator of a gas or electric cooker are positional data input devices with memory capability requiring only intermittent instruction. Such positional data input means may provide tactile and/or visual indication of the control data they contain.

According to the present invention, control apparatus comprises three signal stores of which a first and second provide outputs constituting control signals, and selector and feedback means coupled between the first and second stores and the third store, the arrangement being such that in a first selection mode the signals in the first and second stores can be selectively adjusted automatically into conformity with a signal in the third store and in a second selection mode the signal in the third store can be selectively adjusted automatically into conformity with the signal stored in the first or second store. Thus the third store can be used selectively to determine or to monitor the control signals provided by the first and second stores.

Figure 6:
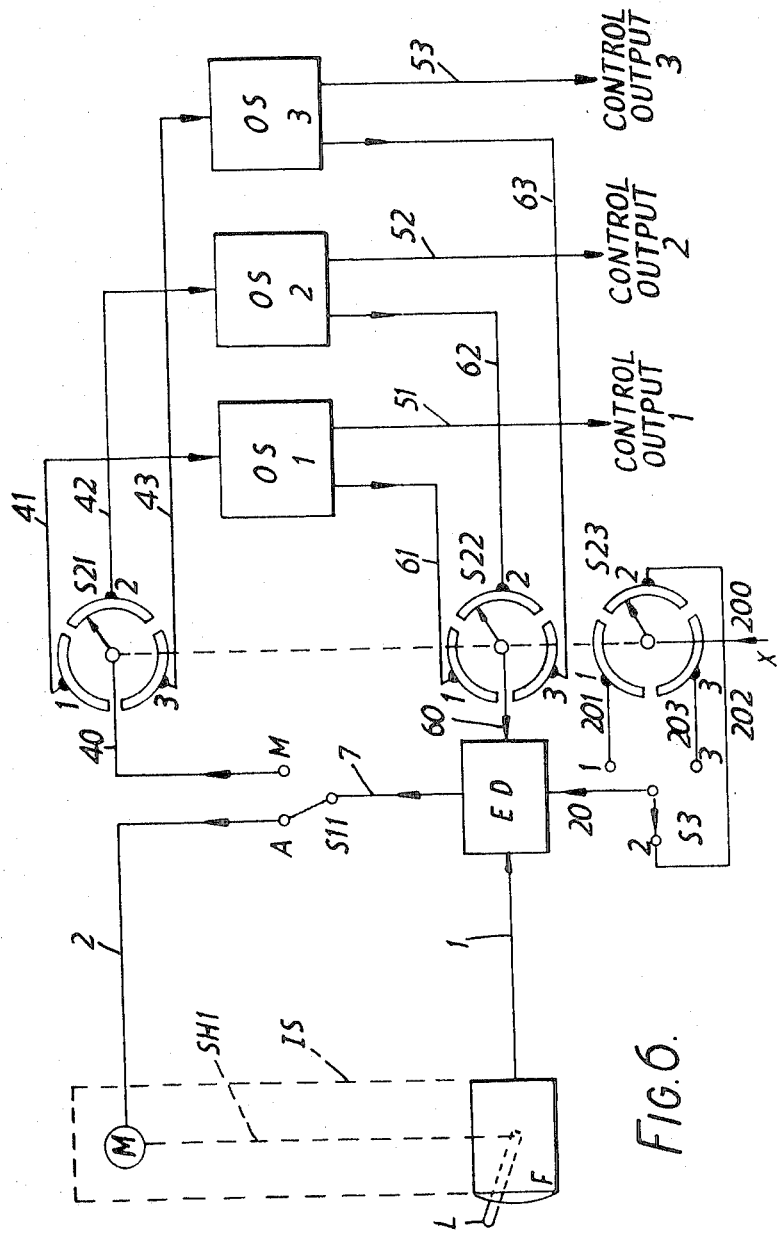

The invention will now be described, by way of example, with reference to the accompanying drawings, in which FIG. 1 shows one embodiment of the invention schematically, FIG 2 is a block circuit diagram of a mode-selection switch, FIG. 3 shows in perspective one form of a manual control lever suitable for use in the arrangement of FIG. 1, FIG. 4 shows an alternative to the lever shown in FIG. 3, FIG. 5 shows a modification of FIG. 2, FIG. 6 shows an embodiment of the invention for time sequential operation, and FIG. 7 is a development from FIG. 6.

In the embodiment shown in FIG. 1 a fader F having an operating arm or lever L moving a cursor C over a scale S rotates a shaft SH1 and produces by known means, e.g. a rotary potential divider (not shown) driven by the shaft SH1, an output signal in a branch 1 representing unambiguously the position of the lever L. A reversible motor M rotates a shaft SH2 in a sense and, if desired, at a rate determined unambiguously by suitable parameters, e.g. electric polarity and magnitude, of a signal in a branch 2. A clutch &1 connects shafts SH1 and SH2 together in the presence of an enabling signal in a branch 3 produced in that branch by a source E when a selector S12 is in its state 'A.' The fader F with the motor M, the shafts SH1 and SH2 and the clutch &1 constituted signal store IS indicated by the dotted outline in FIG. 1, the content of which may be adjusted in either sense either by a signal in branch 2 together with the enabling signal in branch 3 or manually by means of the lever L and which provides in its output branch 1 a signal representing unambiguously its information content and provides also by means of the scale S and the cursor C a visual indication of that information content. The purpose of the clutch &1 is to prevent drag on the shaft SH1 by the motor M when the lever L is operated by hand. If the drag of motor M when deenergized is sufficiently small, the clutch &1, the branch 3, the selector S12 and the enabling source E may be deleted and the shafts SH1 and SH2 may be coupled to one another permanently.

Three other stores OS1, OS2 and OS3 store control signals each of which may be adjusted in a sense and, if desired, at a rate determined by parameters, e.g. electric polarity and magnitude, of a signal applied to its associated control branch, 41, 42 or 43. The stores OS1, OS2 and OS3 provide their output signals at the terminals Control Output 1, Control Output 2, Control Output 3 of branches 51, 52, 53 respectively, and second output signals in branches 61, 62, 63 respectively, both output signals in each case representing unambiguously the signal stored in the associated store. A pair of ganged channel selectors S21, S22 selectively and respectively connect a branch 40 to the control branch 41, 42 or 43 of the store OS1, OS2 or OS3 and the second output branch 61, 62 or 63 of the selected store to a branch 60. The output branch 1 of the store IS and the output branch 60 of the selected store OS1, OS2 or OS3 each provide one input to an error detector E.D. The error detector E.D. produces in a branch 7 an output signal unambiguously representative of the sense and, if desired, the magnitude of the difference between its inputs from the branch 1 and the branch 60. The output branch 7 of the error detector E.D. is connected by a mode selector S11 either to the branch 2 to set the arrangement into an 'automatic' state (selector S11 in state 'A') or to the branch 40 to set the arrangement into a 'manual' state (selector S11 in state 'M'). If the clutch &1 is used, the selector S12 is ganged with selector S11 so that the shafts SH1 and SH2 are coupled when the arrangement is in its 'automatic' state and not coupled when the arrangement is in its 'manual' state.

The responses of the store IS, the store OS1, OS2 and OS3 and the error detector E.D. are all so arranged that an output in the branch 7 from the error detector E.D. changes the content of any store it drives in such a sense as to reduce the difference between the signals in branches 1 and 60. The response of the arrangement is then such that if the mode selector S11 is in state 'A,' the error detector E.D. so drives the motor M as to set the fader F to produce an output in the branch 1 identical to that in the branch 60 due to the content of the control-signal store selected by the selector S21, S22, i.e. the store selected from OS1, OS2 and OS3 acts as 'master' and the store IS as 'slave,' whereas if mode selector S11 is in state 'M,' setting the arrangement to its 'manual' state, the error detector E.D. so drives the store selected by selector S21, S22 as to produce an output in branch 60 identical to that in branch 1 due to the content of store IS, i.e. the store IS acts as 'master' and the selected other store as 'slave.'

For plant control purposes Control Output 1, Control Output 2, control Output 3, etc. from the stores OS1, OS2, OS3, provide continual control signals specifying required plant parameters; the selectors S21, S22 select any one of the stores OS1, OS2, OS3 for monitoring or for adjustment into conformity with store IS; the mode selector S11 determines whether the store IS functions as a slave indicator of the signal in the selected other store or as positional manual control means for determining the signal in the selected other store; and the store IS functions as a visual or tactile indicator of the information stored in the selected other store or as manual positional input means controlling the information in that selected other store. The selectors S21 and A22 may be a known matrix AND-gates such as the AND-gate channel-selector matrices described in the specification of copending British patent Application No. 47340/66 allowing selection of any channel in a time-multiplex control system.

The mode selector S11 may be a mechanical or electronic switch such as that of FIG. 2. In FIG. 2 a detector D drives an amplifier A through a branch 8 to produce complementary output signals in two branches 91 and 92, branch 91 being energized and branch 92 unenergized or conversely in dependence on the sense or magnitude of the output of the detector D in the branch 8. The branches 91 and 92 respectively provide one input to a gate &21 or &22, the other input of each gate being a trigger signal T in a branch 100. As signal in branch 91 enables the gate &21 while the complementary signal in branch 92 inhibits &22. The signal T appears in a branch 101 but not in a a branch 102, so setting a toggle circuit T/C as to produce an enabling output to gate &31 in a branch 111 and an inhibiting output to a gate &32 in a branch 112. The signal in the branch 7 appears in the branch 2 but not in the branch 40. Conversely a signal in the branch 92 enables the gate &22 while the complementary output in the branch 91 inhibits the gate &21; the signal T in the branch 100 appears also in the branch 102 but not in the branch 101, so setting the toggle circuit T/C as to produce an enabling output to the gate &32 and an inhibiting output to the gate &31. The signal in the branch 7 now appears in the branch 40 but not in the branch 2. If the branches, 2, 7 and 40 of FIG. 2 are the branches 2, 7 and 40 of FIG. 1 the sense or magnitude of the output of the detector D in FIG. 2 determines the mode, 'automatic' or 'manual,' of the arrangement of FIG. 1.

The trigger signal T gives positive operation of the toggle circuit T/C and controls the exact instant at which changeover occurs, a facility which may be useful in some circumstances. Simpler arrangements are possible. For example, the trigger signal T, branch 100 and gates &21 and &22 may be omitted, and the branches 91 and 92 connected directly to the branches 101 and 102 respectively so that the amplifier A output sets the toggle circuit T/C directly. The toggle circuit I/C also may be omitted, the branches 91 and 92 then being connected directly to the branches 111 and 112 respectively to operate the gates &31 and &32 However, if the detector D has no inherent toggle action or backlash, for example if it is a capacitance bridge, an operating condition can arise in which the mode of the arrangement is indefinite. The toggle circuit T/C provides the backlash necessary to eliminate this uncertainty.

The detector D may be known conductance-detecting means responsive to leakage between contacts mounted at the operating end of the lever L of the fader F or may be known capacitance-sensitive detecting means responsive to the stray capacitance to earth of the lever L, this being insulated from earth and from the framework of the fader F. FIG. 3 and FIG. 4 show possible arrangements of lever L to suit conductance-detecting and capacitance-sensitive detector means respectively. In FIG. 3 the lever L is cut from insulating board covered on either face with thin copper sheet which is photoetched around the mounting boss to insulate the faces from the shaft SH1. The metal operating knob is formed in two halves, K1, K2, held in contact with the copper facings of lever L by nylon or other insulating screws and is so shaped that the operator's fingers will bridge the two halves of the knob when he grasps it. Stationary wiping contacts W held by insulated mounts N connect the two copper faces of the lever L to leads (not shown) connecting to the leakage-sensitive terminals of the conductance detector. The conductance detector of FIG. 2 is such that when the operator grasps the control knob of fader F the leakages provided between the two halves of the control knob by the operator's fingers produces an output in branch 8 of FIG. 2 sufficient to set the arrangement of FIG. 1 to its 'manual' state whereas when the operator releases the control knob the insulation between the two halves K1 and K2 of the knob produces an output in branch 8 of FIG. 2 which sets the arrangement of FIG. 1 to its 'automatic' state. In FIG. 4 the lever L and knob K are of metal but are insulated from the shaft SH1. Stationary wiping contact fingers W connect the lever L to one capacitance-sensitive terminal of the capacitance-sensitive detector D of FIG. 2, the other capacitance-sensitive terminal of this detector being earthed. The detector D is so arranged that when the operator's hand is close to the lever L the signal in the branch 8 of FIG. 2 sets the arrangement of FIG. 1 to its manual' state whereas when the operator's hand is withdrawn the signal in the branch 8 sets the arrangement of FIG. 1 to its 'automatic ' state. Suitable conductance detectors include resistive bridge circuits while suitable capacitance-sensitive proximity detectors include both capacitance bridges and transistor-operated Colpitts oscillator circuits which oscillate or fail to oscillate in dependence on the value of the ratio existing between their base-to-collector and base-to-emitter capacitors. Thus the arrangement of FIG. 1 may be switched to its 'manual' state when the operator's fingers grasp or approach the lever L and to its 'automatic' state when the operator's fingers release or are withdrawn from the lever L.

The error correction rate of the arrangement of FIG. 1 may be such that the time needed for the 'slave' store to align with the 'master' store is not negligible. The error detector E.D. produces output in the branch 7 only while error correction is in progress, in the branch 2 only while the arrangement is in its 'automatic' state and error correction is in progress, and in branch 40 only while the arrangement is in its 'manual' state and error correction is in progress. Known signal detecting and visual indicating means e.g. lamps switched by amplifier-driven relays, may be used to signal to the operator the presence or absence of signals in the branches 2, 7 and 40 and the existence of corresponding states, dynamic or quiescent, in the arrangement of FIG. 1 Similarly, the arrangement of FIG. 2 may be so modified as to make reversion of the arrangement of FIG. 1 to its 'automatic' state dependent on cessation of error-correcting signals in the branch 40 as well as on release by the operator of lever L. This prevents the lever L from moving back in the opposite sense to that in which the operator has just moved it, i.e. momentarily prevents the store IS from aligning to the selected other store, if the operator releases lever L before the arrangement has fully branch 93 only if no signal is present in branches 40 and 49;

The arrangement of FIG. 2 may be modified as in FIG. 5 to delay reversion to the 'automatic' state until the selected other store is correctly aligned. In FIG. 5 the gate &21 produces output only when all of its inputs are enabled. A generator IG produces an enabling signal in with signal present in the branch 40 the generator IG inhibits the gate $&21. Thus when the operator touches the knob K of the store IS the detector D drives the amplifier A to enable the gate &22 and inhibit the gate &21; a trigger signal T from the gate &22 sets the toggle circuit T/C to select the 'manual' state. When the operator resets the fader F, output from the error detector E.D. in the branches 40 and 49 causes the generator IG to produce an inhibiting signal in the branch 93 reinforcing that in branch 91. If the operator withdraws his hand from the knob K before the selected other store is completely reset, the amplifier A produces an enabling signal in the branch 91 and an inhibiting signal in the branch 92, but the gate &21 remains inhibited by the signal in the branch 93 form the generator IG. When the selected other store is correctly aligned signals in the branch 40 cease, the inhibiting signal in the branch 93 is replaced by an enabling signal and the trigger signal T resets the toggle circuit T/C through the gate &21 to select the 'automatic' state of the arrangement. The toggle circuit T/C may be arranged to operate a lamp or lamps (not shown) showing the state of the arrangement.

Only the fader F, operating means for the mode selector S11 and the channel selector S21, S22, an 'active/quiescent' indicator as already referred to and such other continuous indicators of such plant parameters as may be thought necessary need be presented to the operator. The arrangement described allows selective monitoring or 'break-in' manual resetting of any of a multiplicity of control parameters through a compact operator/plant interface. In a complex theatre or TV studio lighting system such as those described in British Patent Application Nos. 47340/66, 47341/66 and 47344/66 the use of the arrangement of FIG. 1 together with proximity-sensitive mode selection means, alignment-signalling means and alignment-dependent reversion from 'manual' to 'automatic' control enables the operator to set up desired lighting plots rapidly, for example by holding the fader lever at a desired brightness setting and selecting in sequence those channels required to be set at that level and to check rapidly or reset the brightness setting of any of a multiplicity of lighting channels without fear or causing unwanted or objectionable brightness changes through missetting of the fader while selecting channels.

FIG. 6 shows the arrangement of FIG. 1 adapted for a rudimentary form of time-sequential operation. The selectors S21, S22 and S23 are ganged and are rotated continuously by means, not shown. The selector S22 'scans' the second output branches of the stores OS1, OS2 and OS3 sequentially, connecting each in turn to the input branch 60 of the error detector E.D.; the selector S21 similarly scans the input branches of the stores OS1, OS2 and OS3 in step with S22 and connecting the branch 40 to the input branch of the stores OS1, OS2 and OS3 in step with S22 and connecting the branch 40 to the input branch of the stores OS1, OS2 and OS3 in sequence; and a selector S23 scans branches 201, 202 and 203. The arrangement is such that when the branches 40 and 41 are connected the branches 60 and 61 are connected and the branches 200 and 201 are connected, and so on. In one 'field' period, i.e. in the time taken for one complete revolution of the selectors S21, S22 and S23, the selector S22 produces in the branch 60 a 'field' signal containing one sample from the second output of each of the stores OS1, OS2, and OS3. The output signals in the branches 61, 62 and 63 are arrayed in space whereas the output samples in the branch 60 are arrayed in time; the signal in branch 60 is a 'time-multiplex' signal and selector S22 is a 'time-multiplexer.' The selector S21, which switches signals in the common branch 40 to the input branches of the stores Os1, Os2 and Os3, is a 'demultiplexer' or 'decommutator.'

The selector S3 is manually operated and connects a branch 20 to a selected one of the branches 201, 202 and 203. Error detector E.D. functions only when an enabling signal from a source X is present in the branch 20, i.e. once in each field period as the multiplexer S23 scans that one branch of branches 201, 202 and 203 selected by selector S3. Obviously the branches 20 and 200 may be transposed at the rotor connections of S3 and S23 without affecting the operation of the arrangement.

The store IS operates with the store chosen from OS1, OS2 and OS3 by setting the selector S3, which is designated the 'channel selector'; as before, the store IS acts as master or slave according as the selector S11 is in the 'manual' or the 'automatic' state.

Digital signal processing is advantageous in complex control systems because fast digital logic systems may be built compactly. Such systems must respond to both the presence and the sense of an instruction. In the time-multiplex lighting control systems of British Pat. Applications Nos. 47340/66, 47341/66 and 47344/66 it is convenient to provide separate 'Raise' and 'Dim' signal paths and to energize either or neither of these according to requirements. This allows the use of identical signal pulse polarities and identical logic elements, e.g. 'positive AND' gates, etc. in each path.

The arrangement of FIG. 1, FIG. 5 and FIG. 6 may be adapted to such methods as in FIG. 7.

The elements of FIG. 1, FIG. 5, FIG. 6 and FIG. 7 having corresponding functions have like references. The fader F, motor SM and lever L with knob K all mechanically linked, constitute store IS. Other elements in FIG. 7 include the master oscillator MO, divider DI, core store C5, core drivers CD, buffer store BS, 'Raise/Dim' unit RD, digital-to-analogue converter DA, channel selector S3, output scanner S21, dimmer drives DD and Dimmers DM of FIG. 1 of British Patent Applications Nos. 47340/66, 47341/66 and 43744/66. In this multichannel lighting control system lamp brightness in any particular channel is controlled by the count stored in a corresponding particular channel store which is part of the core store. The channel stores correspond to the stores such as OS1, OS2, OS3 of FIG. 1. There are, however 400 such stores and under control of the master oscillator, divider and core drivers each of the 400 channel stores is read in sequence in to the buffer store and written back into the core store. The count in the buffer store may be increased or decreased by one unit by the 'Raise/Dim' unit in response to a pulse at its 'raise' or 'dim' input port. Driven by the buffer store the digital-to-analogue converter produces a sequence of signal levels each representing the brightness count in a corresponding channel store. This time-sequential analogue signal is decommutated under control of the output scanner, driven by waveforms from the master oscillator and divider, into 400 separate control channels (the dimmer drives) for the dimmers controlling the lamps. A cycle of 400 channel periods constitutes a field. The channel selector, under control of 'units,' 'tens' and 'hundreds' pushbuttons, produces from the master oscillator and divider waveforms an output pulse in each field in that channel period selected by the channel selector pushbuttons.

In FIG. 7 the signal in branch 1 is the output of the fader F while that in the branch 60 is the time-sequential output of the digital-to-analogue converter. The error detector E.D. produces output only in the presence of a timing pulse T2 produced in the branch 20 by the channel selector. The timing pulse T2 is produced at field rate in that channel period selected by the channel selector pushbuttons. For each pulse T2 the error detector E.D. produces an output pulse in the branch 71 if the fader F output in the branch 1 is greater than the brightness signal of the selected channel in the branch 60; an output pulse is produced in branch 72 if the converse is true; and no output is produced if the signals in the branch 1 and the branch 60 are equal within predetermined limits. The toggle circuit T/C selects the 'automatic' state of the arrangement, enabling gates &311 and &312 and inhibiting gates &321 and &322, or the 'manual' state, enabling gates &321 and &322 and inhibiting gates &311 and &312, according as the operator's hand is remote from or touching the knob K of the fader F. In the 'manual' state output from the error detector E.D. appears as 'raise' pulses in branch 401 or as 'dim' pulses in branch 402. These are applied to the corresponding input ports of the 'Raise/Dim' unit, modifying the count held in the selected channel store. The error detector E.D., the 'Raise/Dim'b unit, the buffer store and the digital-to-analogue converter are so arranged that in the 'manual' state output from the error detector E.D. modifies the brightness count of the selected channel in such sense as to reduce the difference between the signal in the branch 60 in the selected channel period and that the branch 1. The generator IG comprises two inverters 11, 12 and gate OR1; either inverter produces an inhibiting pulse in branch 93 in the presence of a pulse in its input branch. If the inverters 11 and 12 are of suitable type the OR function may be obtained simply by connecting together the two inverter output terminals.

The trigger pulse T1 in the branch 100 is generated at field rate by the channel selector in each channel period of the selected channel, as is the timing-pulse T2, and is arranged to occur entirely within the duration of timing pulse T2. When the operator releases the knob K of fader F the presence of inhibiting pulses in branch 93 due to 'raise' pulses in the branch 401 or 'dim' pulses in the branch 402 prevent the gate &21 from resetting the toggle circuit T/C to select the 'automatic' mode until the count in the selected channel store corresponds with that selected by the fader F and output from error detector E.D. ceases.

In the 'automatic' mode when the toggle circuit T/C enables gates &311, &312 and inhibits gates &321, &322, output from the error detector E.D. appears in the branch 21 if the fader F output is greater than the analogue signal for the brightness level of the selected channel; it appears in the branch 22 if the converse is true; and it appears in neither if these signals are equal within predetermined limits. The motor SM is a stepping motor driven by a known motor drive logic system MDL, for example two toggle circuits each driving one field-coil pair of the stepping motor SM through suitable output amplifiers in such sequence as to rotate its armature in one sense for pulses applied in branch 21 and in the opposite sense for pulses in branch 22. The motor SM, motor drive logic MDL, fader F and error detector E.D. are so arranged that output from the error detector causes the motor SM to drive the fader F in a sense reducing the difference between the signal in the branch 1 and the analogue signal of the selected channel in the branch 60. The output of the toggle circuit I/C in branch 23 may b used to deenergized the motor SM in the 'manual' state, for example by inhibiting power supply to the output amplifiers of the motor drive logic MDL, to prevent locking of the motor SM by direct current in its field coils when drive logic MDL is undriven.

The arrangement of FIG. 7 constitutes a sampling servo operative in the selected channel in which in the 'automatic' mode that part of the core store allocated to the selected channel acts as master and the store IS acts as slave and in the 'manual' mode store IS acts as master and the core store for the selected channel acts as slave.

It will be understood that the invention is not limited to embodiments in electrical form. Mechanical, hydraulic and pneumatic forms can also be engineered.

We claim:

1. Control apparatus comprising, in combination: first and second signal stores each having a control signal input, a control signal output and a feedback signal output; a common input means; input-switching means for selectively connecting said common input means to the control signal input of said first or second store; a common feedback means, feedback-switching means for selectively connecting said common feedback means to the feedback signal output of said first or second store; said input and feedback-switching means being functionally coupled to operate in synchronism and connect the same store to said common input and feedback means; a third signal store having a control signal input, a signal output, and manually operated information input means indicative of the content of said third store; an error detector having a first input connected to the signal output of said third store, a second input connected to said common feedback means, and an output; and mode-switching means for selectively connecting the output of said error detector to the control signal input of said third store or said common input means; the selected first, second or third store being responsive to an output from said error detector to change the signal stored therein, whereby the first selection states of said mode-switching means the signal in said third store is adjusted automatically into conformity with the signal stored in the selected first or second store and in a second selection state of said mode-switching means the signal in the selected first or second store is adjusted automatically into conformity with the signal stored in said third store.

2. Apparatus according to claim 1 wherein the manually operated input means of said third store includes means for detecting close proximity of an operator's hand and producing an output signal in response thereto, and further including means for controlling the operation of said mode-switching means in response to the output signal of said proximity-detecting means, whereby said mode-switching means connects the output of said error detector to said common input means in response to close proximity of an operator's hand to said manually operated input means and otherwise connects the output of said error detector to the control signal input of said third store.

3. Apparatus according to claim 2 wherein said proximity-detecting means comprising a metallic operating member having an insulating knob, and circuit means for sensing the capacitance between said metallic operating member and an operator when said knob is grasped by the operator.

4. Apparatus according to claim 2 wherein said proximity-detecting means comprises an operating member having two metallic components separated by insulating material, and circuit means for sensing leakage current conducted between said metallic components when said operating member is grasped by an operator in a manner bridging said metallic components.

5. Apparatus according to claim 1 wherein said input and feedback switching means are operative to scan the control signal inputs and feedback outputs simultaneously of said first and second stores in a recurring sequence, and further including an enabling signal source and a periodically enabling switching means connected between said enabling signal source and said error detector for rendering the error detector responsive at selected times in said sequence corresponding to scanning of a selected one of said first and second stores.

6. Apparatus according to claim 1 further including means responsive to operation in the second selection state of said mode-switching means, wherein the output of said error detector is connected to said common input means, for inhibiting change to the first selection state of said mode-switching means until adjustment of the signal in said selected first or second store into conformity with the signal in said third store is completed.

* * * * *